(12) United States Patent
Douglas et al.

(10) Patent No.: US 10,317,218 B2
(45) Date of Patent: Jun. 11, 2019

(54) PLANETARY SURVEILLANCE SYSTEM

(71) Applicants: David Byron Douglas, Winter Park, FL (US); Robert E. Douglas, Winter Park, FL (US)

(72) Inventors: David Byron Douglas, Winter Park, FL (US); Robert E. Douglas, Winter Park, FL (US)

( * ) Notice: Subject to any disclaimer, the term of this patent is extended or adjusted under 35 U.S.C. 154(b) by 223 days.

(21) Appl. No.: 15/207,647

(22) Filed: Jul. 12, 2016

(65) Prior Publication Data
US 2018/0017394 A1   Jan. 18, 2018

(51) Int. Cl.
| | | |
|---|---|---|
| *G01C 21/24* | (2006.01) | |
| *G06K 9/00* | (2006.01) | |
| *G06K 9/62* | (2006.01) | |

(52) U.S. Cl.
CPC .......... *G01C 21/24* (2013.01); *G06K 9/0063* (2013.01); *G06K 9/6202* (2013.01)

(58) Field of Classification Search
CPC .............................. G01C 21/24; G06K 9/0053
USPC ......................................................... 701/531
See application file for complete search history.

(56) References Cited

U.S. PATENT DOCUMENTS

| | | | | |
|---|---|---|---|---|
| 5,512,743 A * | 4/1996 | Shaffer | ................... | B64G 3/00 250/203.6 |
| 6,754,368 B1 * | 6/2004 | Cohen | ................... | G01S 7/4008 348/143 |
| 6,757,612 B1 * | 6/2004 | Talent | ...................... | B64G 1/68 702/2 |
| 7,105,791 B1 * | 9/2006 | Poller | ...................... | B64G 3/00 250/203.1 |
| 8,025,002 B2 * | 9/2011 | Piccionelli | ............. | B64G 1/002 244/158.4 |
| 8,947,524 B2 * | 2/2015 | Altwaijry | .................. | G01S 5/16 348/135 |
| 2003/0202682 A1 * | 10/2003 | Yanagisawa | .............. | G06T 7/20 382/103 |
| 2005/0060092 A1 * | 3/2005 | Hablani | ................... | B64G 1/24 701/472 |
| 2012/0229626 A1 * | 9/2012 | Altwaijry | .................. | G01S 5/16 348/135 |
| 2013/0193303 A1 * | 8/2013 | Smith | ..................... | G01C 21/24 250/203.6 |
| 2016/0377700 A1 * | 12/2016 | Englert | ..................... | G01S 5/10 342/357.78 |
| 2017/0067996 A1 * | 3/2017 | Coyle | ..................... | G01S 17/66 |

OTHER PUBLICATIONS

Neus Llado et al., Capturing small asteroids into sun-Earth Lagrangian point, Nov. 14, 2013, Elsevier LTD, pp. 176-188 (Year: 2013).*

* cited by examiner

*Primary Examiner* — Marthe Y Marc-Coleman
(74) *Attorney, Agent, or Firm* — Anderson Gorecki LLP

(57) ABSTRACT

A computer-implemented planetary surveillance system method and apparatus is presented. A first space object detection system is disposed proximate Earth, wherein the first space object detection systems include a first constellation of Planetary Surveillance System Platforms (PSSPs) that provide warning of asteroids approaching Earth and on a path which has a likelihood of impacting Earth. At least one additional space object detection system is also used.

20 Claims, 8 Drawing Sheets

PLANETARY SURVEILLANCE SYSTEM

BACKGROUND

There are numerous objects in space. Among these space objects are asteroids, meteors, planets, stars and even debris (also known as space junk). An asteroid is a large, irregularly shaped object in space that orbits our Sun. An asteroid is like a comet, however, while comets are mostly made of ice, asteroids are made up of rock or metal. This makes asteroids more dangerous than other space objects because they can cause a lot of damage if they collide with a planet. The craters on the Moon were formed by asteroids and a popular theory suggests that it was an asteroid that wiped out the dinosaurs. Around a million asteroids are located between Mars and Jupiter in an area called the "asteroid belt."

There are an unknown number of asteroids in varying sizes and orbits, and only about 1,000 are actively tracked. We know on a frequent basis a new asteroid is identified with projected paths near Earth and impact times is in days. The asteroid which impacted Jupiter on 19 Jul. 2009 caused damage thought to be equivalent in size to the Pacific Ocean, but it was not detected before the impact. Many small asteroids impact Earth on a daily basis and a few cause considerable damage every decade. Others are of such a size that their impact could end life on Earth as we know it, such as the one that ended the dinosaurs. The first observation of asteroids can be when impact actually occurs as happened recently in Russia.

SUMMARY

Long range identification of life threatening space objects, including but not limited to asteroids, is key to one or multiple engagements in order to have a higher probability of protecting Earth for our posterity. The purpose of the presently described planetary surveillance system is to an asteroid detection system and describe its potential operation. It is intended to be the eyes that would alert a companion system that would be a ground launched system used to deflect or destroy the incoming asteroid.

The presently described planetary surveillance system includes one or more various phases of the asteroid detection system. A first phase (Phase 1) involves the placing of a series of Planetary Surveillance System Platforms (PSSPs) in a solar orbit in close proximity to the Earth, which will monitor for asteroids coming in toward the Earth. A second phase (Phase 2) involves the placing of a series of PSSPs in a position near the Sun near the Aten asteroid belt to monitor the Aten asteroid belt. A third phase (Phase 3) includes the placing of a series of PSSPs in a position near the asteroid belt between Mars and Jupiter to monitor the asteroid belt. A fourth phase (Phase 4) includes the placing of a series of PSSPs in the outer portions of our Solar system to monitor asteroids in the outer portions of our solar system.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
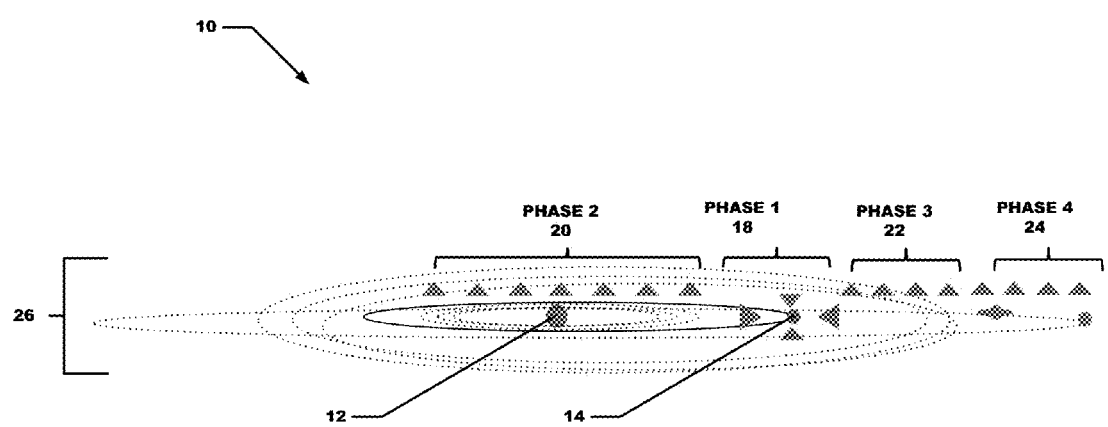
FIG. 1 is a diagram of the various phases of the asteroid detection system in accordance with a particular embodiment of the present invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

A Planetary Surveillance System (PSS) is disclosed. The PSS includes multiple layers of constellations of Planetary Surveillance System Platforms (PSSPs) within a Planetary Surveillance Coordinate System (PSCS). The PSS provides one or more planetary surveillance platforms (PSSP) operating as constellations spaced at various ranges from the sun and above and below the general plane of the planets in the planetary system. It should be appreciated that while the description discusses the detection of asteroids in particular, the same concepts are applicable to other space objects, including but not limited to, meteors, planets, stars and debris.

FIG. 1 provides an overview of the various phases of the asteroid detection system 10. The circle seen in the center of the image is the Sun 12. The dotted ellipses represent asteroids orbiting the Sun. Earth 14 is shown orbiting the Sun 12. The gray triangles represent the asteroid detection satellites. Phase 1 involves the placing a series of PSSPs in a solar orbit in close proximity to the Earth, which will monitor for asteroids coming in toward the Earth. Phase 2 involves placing a series of PSSPs in a position near the Sun near the Aten asteroid belt to monitor the Aten asteroid belt. Phase 3 involves placing a series of PSSPs in a position near the asteroid belt between Mars and Jupiter to monitor the asteroid belt. Phase 4 involves placing a series of PSSPs in the outer portions of our Solar system to monitor asteroids in the outer portions of our solar system.

Figure 2:
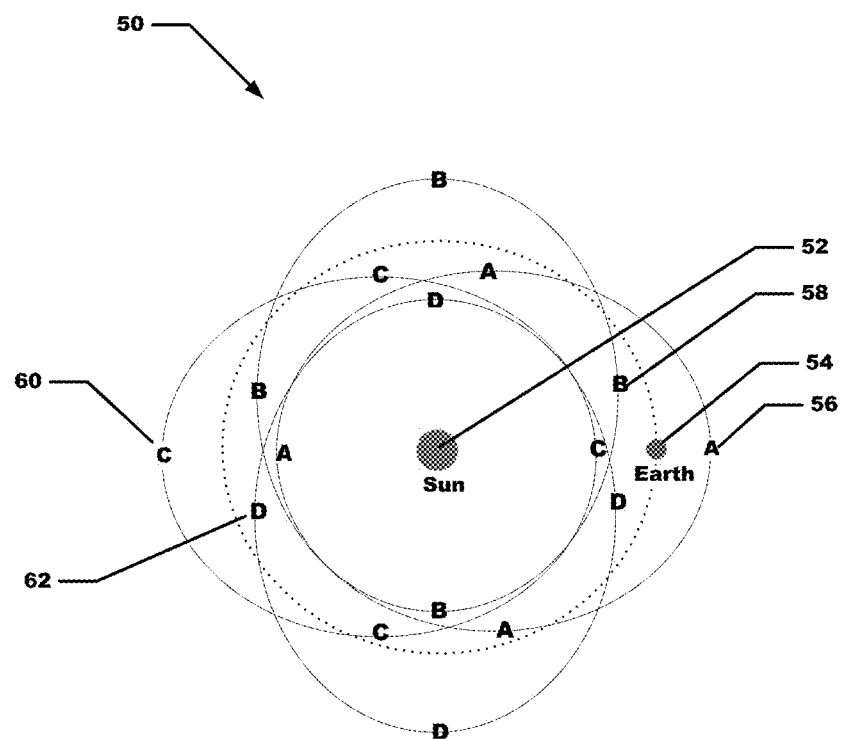
FIG. 2 is a diagram of the orbits of the asteroid detection satellites in accordance with a particular embodiment of the present invention.

Referring to FIG. 1, a diagram of a PSS 10 is shown. The first set of surveillance platforms 18 (shown as triangles) provide surveillance for asteroids approaching Earth 14. As shown in FIG. 2, the preferred embodiment 50 is a constellation of surveillance platforms (designated 56, 548, 60 and 62) in solar orbit positioned around Earth 54 such these platforms travel along their respective orbits in a synchronous manner with Earth and Earth proceeds along the Earth orbit with respect to the Sun 52. The four satellites are shown in various locations designated as "A", "B", "C" and "D" are in elliptical orbits around the Sun with a period similar to that of the Earth. According to Kepler's third law, the orbital period is related to the length of the semi-major axis, not eccentricity. Therefore, the system of satellites would be designed to take on Solar orbits with a similar orbital period of the Earth, of 365.25 days, but would have higher eccentricity than the Earth's orbit to provide greater distance from the Earth and better detection. Note that satellite "A"'s aphelion position (the A at the far right of the figure) is at a distance of greater than 1 AU from the Sun at one portion of the orbit (i.e., winter), but it's perihelion position (the A at the far left of the figure) is closer than 1 AU 6 months later (i.e., summer). At time point #1 winter, satellite A would be at the aphelion of the orbit and would have the slowest orbital velocity and satellite C would be at the perihelion of the orbit with the fastest orbital velocity. At time points #2, #3 and #4 the satellites would assume new positions and would point radially away from the Earth at all times. Note that other satellites have similar alternating positions, such that used together with varying orbital inclinations, the system of PSSPs will surround the Earth at all times. In addition to having numerous additional elliptical Solar orbits, additional possible orbits, such as Earth orbiting satellites, Earth trailing Solar orbits, Earth leading Solar orbits or orbits with a distance closer than 1 AU, but maintaining a period of 1 year by using a solar sail would also be used.

These surveillance platforms provide detection of asteroids approaching Earth. Detection is, in this example, for space objects (e.g., asteroids) in the 700-meter diameter class. Impact on Earth by this size asteroid is projected to destroy an area about the size of Virginia if it hit land and cause a major tsunami if it hit an ocean. Assuming a warning period of 5 days to launch protective measures (e.g., weapons to deflect or breakup the asteroid), and based on an estimated 25 kilometers/second approach speed of the asteroid and a 5-day warning period, it would be required to detect theses asteroids at a distance from Earth of about 7.5 million miles. A protective circle around Earth of that radius would thus have a circumference of about 42 million miles. Table 1 provides an illustration of varying warning times and impact on surveillance radius and circumference. Orbital inclinations for asteroids in the asteroid belt are less than 25 degrees. So a belt of surveillance platforms at a distance of 7.5 million miles from Earth with a vertical field of view/field of regard (FOV/FOR) of 45 degrees would be required (i.e., +25 degrees for descending orbits and –25 degrees for ascending orbits). Next we illustrate a visible light camera array (but not limited to a visible light camera array) for surveillance. We assume an electro-optical camera system with instantaneous field of view (iFOV) of 0.000158 degrees. (Note: the DARPA Argus camera provides 1.6 gigapixels and an iFOV of 0.00158 degrees and with advances in technology, a camera which provides 10 times the Argus resolution was assumed.) With this camera, detection of the 700 meter class (or greater) asteroid could reach a range of 156,000 miles. It should be noted that there are methods to enable sub-pixel detection. The fact that the potentially dangerous asteroid is not moving in the direction of the planetary flow could be used to enhance detection probability at greater ranges. Such technologies would be applied, as applicable. The postulated field of regard for this camera was 180 degrees horizontal by 45 degrees vertical. The illustrative employment concept for initial deployment of the surveillance platforms would be to position the surveillance platforms relatively evenly spaced along the circumference of 7.5 million-mile radius belt around Earth. A large number of surveillance platforms would be required to provide a surveillance belt of approximately 3.5 million miles wide in the vertical direction and with a 42,000,000 mile-circumference. This lead to investigation of shorter warning periods. (Table 1). A consideration in the shorter warning times is the time/distance relationship between the launch point and asteroid impact point by the intercept system. For example, it would take about 10 hours for an intercept vehicle at escape velocity of 11.2 km/second to get to a distance of the radius of the moon from Earth. This would be subtractive from any warning period, leaving less time available for launch preparation.

TABLE 1

Impact of Warning Period on PSS Radius and Circumference

| Days Warning | Radius (in miles) | Circumference (in miles) |
| --- | --- | --- |
| 1 | 1,339,200 | 8,414,435 |
| 2 | 2,678,400 | 16,828,869 |
| 5 | 6,696,000 | 42,072,173 |

TABLE 2

Impact of Warning Time and Class of Asteroid on Approximate Number of PSSPs Required
Total Surveillance Platforms Required

| Days Warning | Asteroid size (in meters) | | |
| --- | --- | --- | --- |
| | 700 m | 1700 m | 3000 m |
| 1 | 214 | 36 | 11 |
| 2 | 859 | 145 | 46 |
| 5 | 5369 | 910 | 292 |

Over 1,000 asteroids which are potentially dangerous to earth have been identified. Tracks on these asteroids are imprecise and it is not known whether the list is complete. Note that there is currently NEOSSat, which is in an Earth orbit and provides improved detection of Aten asteroids in proximity to Earth. The planetary system would consist of surveillance platforms in either an orbit around the sun or stationary at varying ranges from the Sun where accuracy of tracking would be optimized and warning time of potential impact would be increased. Stationary positions could be achieved through the use of solar sails whereby the propulsion forces of the solar photons balance the gravitational pull from the Sun. More accurate tracking would enable better estimates of an incoming asteroid's trajectory, the impact time on Earth and refinement of response plans. It is envisioned that these surveillance platforms would "be stationary" in that their position with respect to their planetary coordinates would not change. The interval between observation and updating the track location of a particular asteroid would decrease in proportion to the constellation size for this mission. Those PSSPs which were launched early during deployment phase could provide information regarding track accuracy over time and this information could help guide the number of PSSPs deployed.

Figure 3:
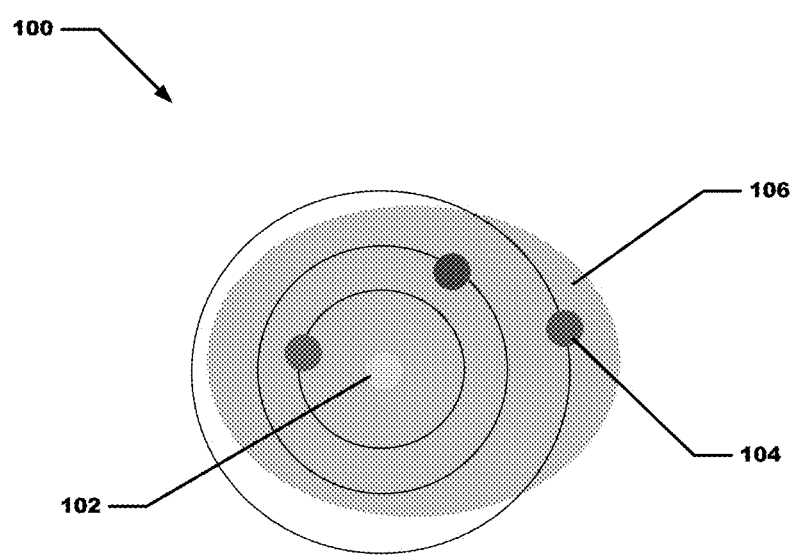
FIG. 3 is a diagram of the Aten asteroid region.

The next set of surveillance platforms 20 would provide surveillance for Aten asteroids whose orbits generally inside of Earth's orbit but intersect some portion of the Earth's orbit. As shown in the environment 100 of FIG. 3, the Aten asteroid region 106 intersects with the orbit of Earth 104 as well as the sun 102.

The next set of surveillance platforms 22 would provide surveillance for the asteroid belt between Mars and Jupiter. This belt is estimated to contain between 1.1 to 1.9 million asteroids larger than 1 km in diameter and millions more of smaller diameter. A 1.7 km asteroid impact could cause widespread damage destroying a large land mass if it hit land or cause major tsunamis if it hit an ocean. Although these asteroids are primarily in an orbit around the sun, interactions between multiple asteroids, comets, etc., could change their orbit and endanger Earth. Given the large number, it is surprising that only a handful are actively tracked—the named ones are in excess of 2,000 km in diameter. It is envisioned PSSPs of this constellation would be stationary, and, as with those in the Aten constellation, the revisit interval is dependent upon the number of PSSPs deployed.

The next set of surveillance platforms 24 would provide surveillance for outer reaches of the planetary system. These PSSPs would have the purpose of detecting large objects (e.g., Earth sized objects), which are on a trajectory to intercept our planetary system. The PSSP for this region would most likely be a different design that those PSSPs in constellations described. For example, solar panels would not provide sufficient power for operation, and visible light cameras would likely be replaced by infrared ones.

Figure 4:
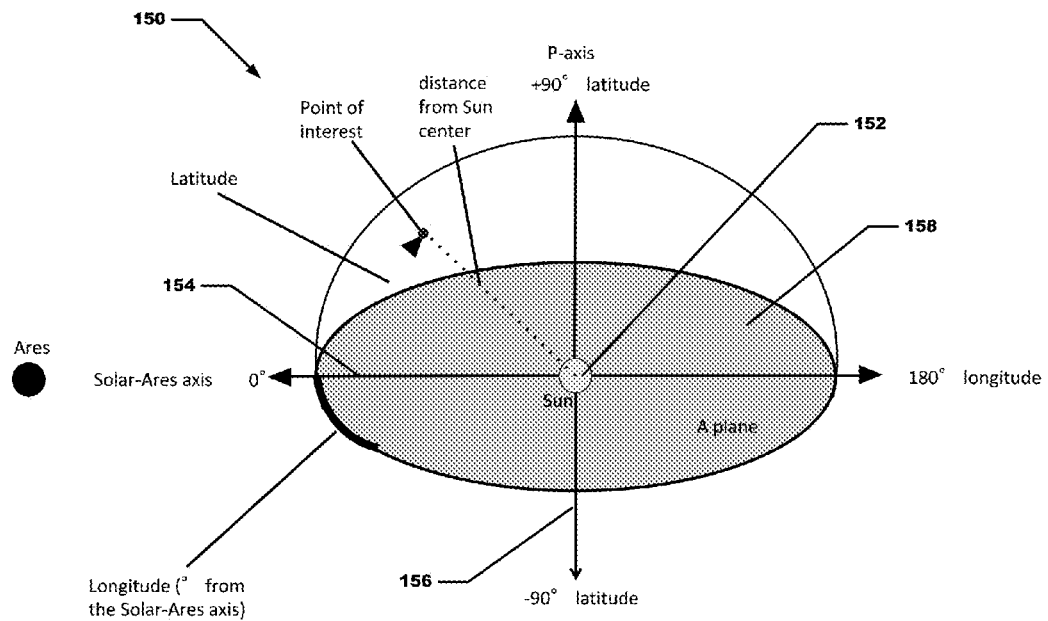
FIG. 4 is a diagram of the coordinate system used in accordance with a particular embodiment of the present invention.

There is a need to establish a polar coordinate system for the surveillance system. The Galactic Coordinate System (GCS) 150 was selected, but additional features could be added, as shown in FIG. 4. The GCS 150 is based on: the sun 152 being center; a vector 154 which is perpendicular to the plane of the plane of our solar system planets; and a vector 156 pointing to the center of the star Ares. The line from the center of the Sun toward the direction of Ares represents 0°, is referred to as Solar-Ares axis. An orthogonal line to the Solar-Ares axis extending through the center of the Sun is referred to as the "P axis". Multiple stars can be used as reference points to define the P-axis as stars great distances away will be in more of a fixed location. A plane including Ares, the Sun center and orthogonal to the P axis is shown as the gray ellipse, which will be referred to as the A plane 158. For example, using a Polar coordinate system, the first coordinate represents longitude or the angle from 0° on the Solar-Ares axis in the A plane ranging from 0° to 360°. The second coordinate represents latitude or the angle from the "A plane" ranging from −90° to 90°. The third coordinate represents the distance from the center of the Sun.

In order to perform broad planetary surveillance within our Solar System, it is necessary to introduce information on Latitude, Longitude and distance from the Sun for any object within our Solar System, which is defined in the PSCS. In addition to knowledge about the PSCS position, it is also important to have information on the velocity and acceleration. Furthermore, it is important to have information regarding PSS attitude—that is the roll, pitch and yaw of man-made objects operating in space. This information facilitates passage of information regarding location of an asteroid between any two entities within PSS. For example, if the PSS has roll, pitch and yaw and has exact information regarding which element (e.g., which pixel) of which sensor detected the asteroid, then an accurate Galactic latitude/longitude can be computed and passed through channels to elements that are part of the system operation.

The PSS would establish a capability to determine roll, pitch and yaw (RPY) of man-made objects to be placed into orbits of earth, sun, planets, and their moons. This will be useful in orienting laser communication systems, directing energy, etc.

Each spacecraft would have a central X, Y, Z vector system. If the spacecraft's orientation were perfectly aligned with the orbital path then the RPY ($\alpha$, $\beta$, $\gamma$) would be (0,0,0) where $\alpha$ represents the degrees of roll in the x-direction, $\beta$ represents the degrees of pitch in the y-direction and $\gamma$ represents the degrees of yaw in the z-direction. The x-axis is a line representing the direction of orbit where a positive x-direction direction represents line from spacecraft center of mass tangent to direction of spacecraft orbit. The z-axis represents a line within the plane of the spacecraft's orbit from spacecraft center of mass in a direction orthogonal to the x-axis. The y-axis represents the line orthogonal to the x-z plane through the spacecraft center of mass. A roll angle would be measured around the x-axis with a positive angle being measured as a counterclockwise angle from the X vector. An example of pitch angle would be measured around the "Y" axis with a positive angle being measured as a counterclockwise angle from the Y vector. The Y axis would be perpendicular to both the X axis (described above) and the "Z" axis which is the instantaneous tangent of the orbit with positive being the direction of the spacecraft movement along its orbit. A positive pitch angle would be measured in the Y plane in a counterclockwise direction. Similarly, the yaw angle would be measured in the Z plane with positive being the angle being measured counterclockwise from the Z axis.

Each key element for spacecraft operation has a factory measured XYZ orientation together with corrective factors to account for space temperatures, etc. There would be a star tracking system on the spacecraft. There must be an internal star directory, some of which stars would be selected depending on time of year, potential interference with line of sight to a particular star (e.g., would have to look near sun or occluded by some planet/moon). Instantaneous RPY could be computed from knowing the spacecraft location in polar coordinates: theoretical angles to each of the reference stars based on RPY of the spacecraft being in the (0,0,0) orientation; and changes in X, Y, Z angles to the various stars being used at that instantaneous time. An internal navigation system could be incorporated and this will also be important in controlling rates of RPY and any acceleration of RPY rates.

Depending on the spacecraft mission and key components to perform the required function, control of RPY might be useful/needed. This control could be accomplished via a solar sail system which could introduce forces in the X, Y, or Z axes.

A planetary surveillance system platform would include the following subsystems. Each PSSP would include a set of very high resolution electro-optical cameras. Near spherical coverage would be provided with the flexibility of providing differing levels of resolution to different regions of the sphere. For example, in the region associated with covering+20 degrees of the planetary plane and, consequent highest probability of an inbound asteroid, would have the highest resolution. Other regions with lower likelihood of inbound asteroids would have lower resolution. In these regions, large (e.g., 3,000 meter diameter) could be screened whereas smaller ones might pass through undetected. The camera type could be along the lines of the DARPA Argus system which has gigapixel resolution, but the PSSP surveillance technology is not limited to this type of camera.

The system would also be equipped with an image processing capability. The system during 'normal' times could use optical flow of planets as a primary reference. Normal times being those periods wherein no asteroids or other objects are crossing the PSSP FOV/FOR. The planet moons would not provide optical flow per se, but would have a predictable pattern which could a factor in determining 'normalcy'. With the optical flow and the various moons predictable patterns, a scene reference could be established for any point in time. Then, the reference scene could be subtracted from the observed scene and 'extraneous objects' would be identifiable. This would include methods to deal with stars in a frame of imagery and changes in intensity as asteroid and star are in the same pixel. These objects could be placed in a track file and angular movement rates established. A prioritization scheme could be established to determine which objects needed to be located and their trajectory measured. Considerations in implementing the image processing include, but are not limited to: use of parallel processing to deal with the high resolution data; frame rate required; scanning a small FOR within a larger FOR. Heat generated by the computing component could be cooled through radiation into space which is approximately 3 degrees Kelvin The PSSP system would also be equipped with a laser for determining both range and range rate to the extraneous object. Given a particular asteroid was declared an asteroid of interest, the following would occur: entered into a track file; tracking gates placed around the asteroid; and range and range rate be re-determined at specified intervals to refine orbital parameters.

A computational system would compute the X, Y, and Z angles from the PSSP to the extraneous object. Also, angle rate changes and laser ranges and range rates would provide input to computational system in order to determine planetary coordinate and trajectory.

A communication subsystem would pass extraneous object data back to control stations on earth. A trade as to whether to use lasers or radio frequency communications would be made and either technology would be selected depending on spacecraft system location, power requirements and subsystem weight.

The PSSP RPY subsystem would determine the attitude of the platform. This would involve star tracking of bright stars in both northern and southern hemispheres. Stars actually included in active tracking would change over the seasons of the year, based on possible occlusion by the sun, planets, or moons. Any differences between ground calculated star positions and observed position would be passed to the control system. This subsystem would also have a precise position navigation system to detect small changes in RPY. This subsystem would interface with the control subsystem to maintain platform stability.

A control subsystem would control any changes in PSSP location or attitude and adjust solar sails or other elements (e.g., thrusters) to maintain platform stability. The control sub-element would direct other subsystems (e.g., direct laser pointing and lazing).

A set of solar sails or other elements (e.g., thrusters) to control RPY, change PSSP location. For example, if a comet were to approach the asteroid belt, it might be prudent to change the PSSPs locations for an improved view of possible interactions between asteroids and the comet.

A power subsystem. A trade study to determine the best option (e.g., solar panels, radioisotope thermoelectric generator, other) to provide the needed power for the various subsystems would identify Other than the PSSPs surrounding Earth, one of the options for the other PSSPs is to have them stationary, as opposed to some orbit around the Earth or sun. By stationary, we mean that the galactic coordinates do not change over time.

The concept is that the Planetary Surveillance System Platforms would be launched and, after leaving Earth's atmosphere, would be on an orbital path that would pass through the intended stationary position. The velocity along this path would gradually be changed such that the Planetary Surveillance System Platform would have zero velocity upon arrival at that location. There would be gravitational forces on the Planetary Surveillance System Platform which would be countered by the movement subsystem to maintain the orbital path as the Planetary Surveillance System Platform proceeds along its path and loss of velocity would gradually draw the Planetary Surveillance System Platform off of its intended path. Once at the intended location the movement subsystem would use anti-gravitational forces (e.g., solar sail) to maintain the Planetary Surveillance System Platform constant location.

Figure 5:
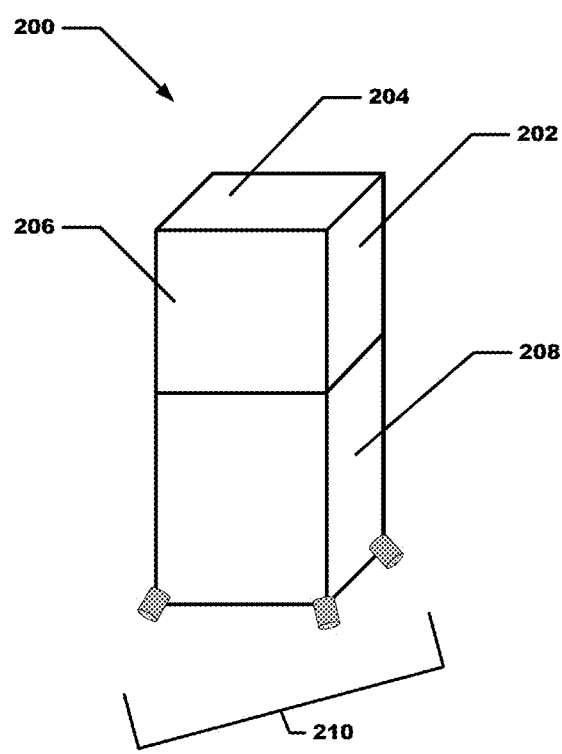
FIG. 5 is a diagram of a satellite in accordance with a particular embodiment of the present invention.

Referring now to FIG. 5, an overview of a satellite 200 is shown. The top portion of this diagram shows multiple camera arrays 202, 204, 206 and 208 on the sides of the spacecraft. Spacecraft supporting elements including power system, communications system, laser range finder with omnidirectional pointer, computer, image processor, control element (to maintain roll, pitch and yaw). Note solar sails may be used, but are not shown in this illustration. Thrusters 210 are shown at the bottom of the spacecraft.

Figure 6A:
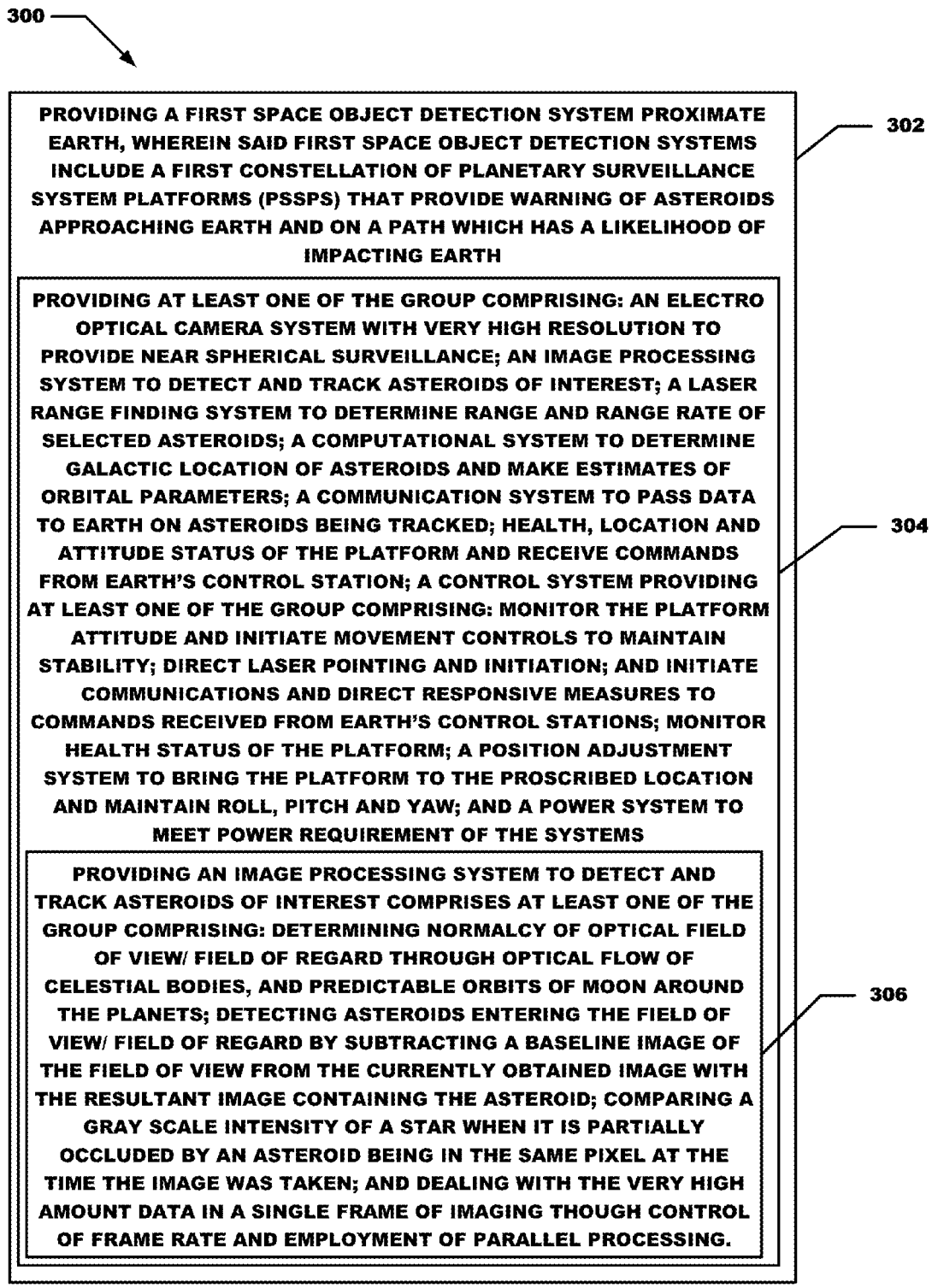
FIGS. 6A through 6C illustrate a method of providing a planetary surveillance system.
Figure 6B:
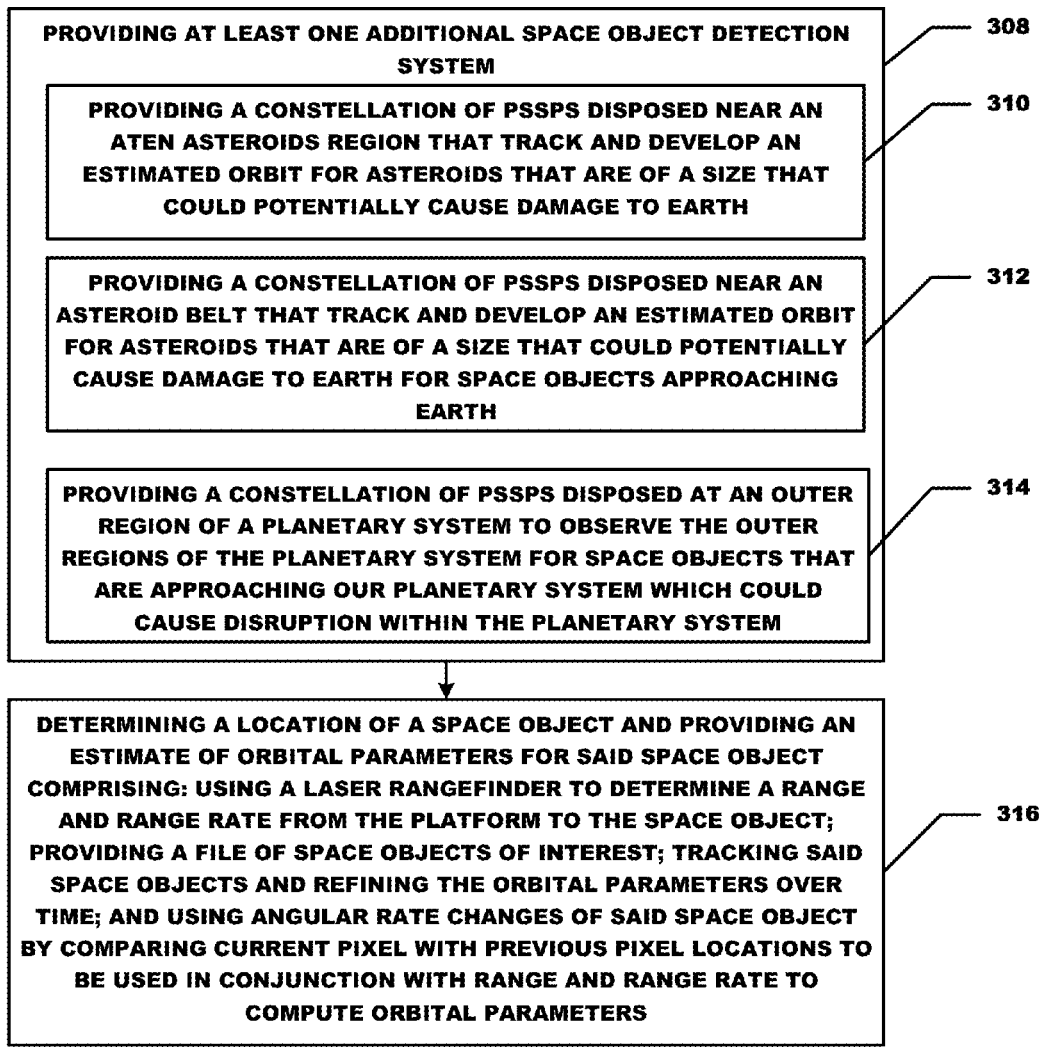
Figure 6C:
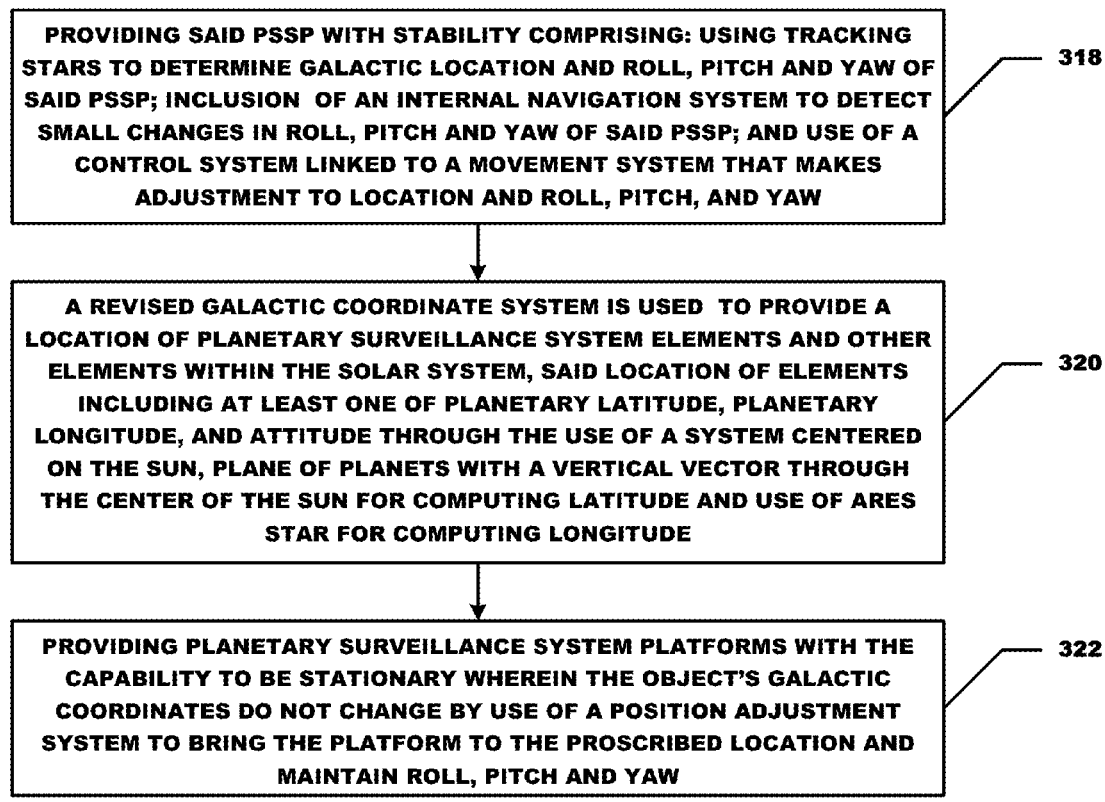

Referring to FIGS. 6A-6C, a flow diagram of a particular embodiment of a method 300 of providing a planetary surveillance system is presented. Method 300 begins with processing block 302 which discloses providing a first space object detection system proximate Earth, wherein said first space object detection systems include a first constellation of Planetary Surveillance System Platforms (PSSPs) that provide warning of asteroids approaching Earth and on a path which has a likelihood of impacting Earth.

As shown in processing block 304 providing a PSSP comprises providing at least one of the group comprising: an electro optical camera system with very high resolution to provide near spherical surveillance; an image processing system to detect and track asteroids of interest; a laser range finding system to determine range and range rate of selected asteroids; a computational system to determine galactic location of asteroids and make estimates of orbital parameters; a communication system to pass data to earth on asteroids being tracked; health, location and attitude status of the platform and receive commands from Earth's control station; a control system providing at least one of the group comprising: monitor the platform attitude and initiate movement controls to maintain stability; direct laser pointing and initiation; and initiate communications and direct responsive measures to commands received from earth's control stations; monitor health status of the platform; a position adjustment system to bring the platform to the proscribed location and maintain roll, pitch and yaw; and a power system to meet power requirement of said systems.

As further described in processing block 306, said providing an image processing system to detect and track asteroids of interest comprises at least one of the group comprising: determining normalcy of optical field of view/field of regard through optical flow of celestial bodies, and predictable orbits of moon around the planets; detecting asteroids entering the field of view/field of regard by subtracting a baseline image of the field of view from the currently obtained image with the resultant image containing the asteroid; comparing a gray scale intensity of a star when it is partially occluded by an asteroid being in the same pixel at the time the image was taken; and dealing with the very high amount data in a single frame of imaging though control of frame rate and employment of parallel processing.

Processing block 308 states providing at least one additional space object detection system. As shown in processing block 310 the providing at least one additional space object detection system includes providing a constellation of PSSPs disposed near an Aten asteroids region that track and develop an estimated orbit for asteroids that are of a size that could potentially cause damage to Earth.

Processing block 312 recites wherein said providing at least one additional space object detection system includes providing a constellation of PSSPs disposed near an asteroid belt that track and develop an estimated orbit for asteroids that are of a size that could potentially cause damage to Earth for space objects approaching Earth.

Processing block 314 discloses wherein said providing at least one additional space object detection system includes providing a constellation of PSSPs disposed at an outer region of a planetary system to observe the outer regions of the planetary system for space objects that are approaching our planetary system which could cause disruption within the planetary system.

Processing continues with processing block 316 which discloses determining a location of a space object and providing an estimate of orbital parameters for said space object comprising: using a laser rangefinder to determine a range and range rate from the platform to the space object; providing a file of space objects of interest; tracking said space objects and refining the orbital parameters over time; and using angular rate changes of said space object by comparing current pixel with previous pixel locations to be used in conjunction with range and range rate to compute orbital parameters.

Processing block 318 states providing said PSSP with stability comprising: using tracking stars to determine galactic location and roll, pitch and yaw of said PSSP; inclusion of an internal navigation system to detect small changes in roll, pitch and yaw of said PSSP; and use of a control system linked to a movement system that makes adjustment to location and roll, pitch, and yaw.

Processing block 320 recites wherein a revised galactic coordinate system is used to provide a location of Planetary Surveillance System elements and other elements within the solar system, said location of elements including at least one of planetary latitude, planetary longitude, and attitude through the use of a system centered on the sun, plane of planets with a vertical vector through the center of the sun for computing latitude and use of Ares star for computing longitude.

Processing block 322 discloses providing Planetary Surveillance System Platforms with the capability to be stationary wherein the object's galactic coordinates do not change by use of a position adjustment system to bring the platform to the proscribed location and maintain roll, pitch and yaw.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for early detection of an object approaching Earth, comprising:
monitoring with a first space object detection system proximate Earth, wherein said first space object detection system comprises a first constellation of Planetary Surveillance System Platforms (PSSPs) that detect objects in a solar system;
monitoring with at least one additional space object detection system that detects objects in the solar system and has a stationary galactic coordinate location in the solar system;
detecting the object with the additional space object detection system; and
tracking the object with the first space object detection system and the additional space object detection system.

2. The method of claim 1 wherein monitoring with at least one additional space object detection system comprises monitoring with a second constellation of PSSPs disposed in an Aten asteroids region.

3. The method of claim 1 wherein monitoring with at least one additional space object detection system comprises monitoring with a second constellation of PSSPs disposed near an asteroid belt between Mars and Jupiter.

4. The method of claim 1 wherein monitoring with at least one additional space object detection system comprises monitoring with a second constellation of PSSPs disposed at an outer region of the solar system.

5. The method of claim 1 wherein monitoring comprises:
generating images with an electro optical camera system;
detecting and tracking the objects by processing the images with an image processing system;
determining range and range rate of the objects with a laser range finding system;
determining galactic locations and orbital parameters of the objects with a computational system; and
transmitting information associated with the objects to earth with a communication system.

6. The method of claim 5 wherein the objects comprise asteroids and processing the images comprises:
determining normalcy of optical field of view/field of regard through optical flow of celestial bodies, and predictable orbits of moons around planets;
detecting a first asteroid entering the field of view/field of regard by subtracting a baseline image of the field of view from a currently obtained image with a resultant image containing the first asteroid; and
comparing a gray scale intensity of a star when it is partially occluded by the first asteroid being in a same pixel at a time the image was taken.

7. The method of claim 1 further comprising:
using a laser rangefinder, determining a range and range rate from the platform to each of the detected objects;
generating a set of objects of interest;
tracking the objects of interest; and
calculating orbital parameters of the objects of interest using angular rate changes by comparing current pixel with previous pixel locations to be used in conjunction with the determined range and range rate.

8. The method of claim 1 further comprising:
using tracking stars to determine galactic location and roll, pitch and yaw of each said PSSP;
using an internal navigation system to detect small changes in roll, pitch and yaw of each said PSSP; and
using a control system linked to a movement system to control location and roll, pitch, and yaw.

9. The method of claim 1 comprising using a revised galactic coordinate system to represent locations of space object detection systems within the solar system, including at least one of planetary latitude, planetary longitude, and attitude through the use of a system centered on a sun, plane of planets with a vertical vector through a center of the sun for computing latitude and use of Ares star for computing longitude.

10. The method of claim 9 wherein monitoring with the first space object detection system proximate Earth comprises monitoring with satellites that orbit the sun and do not orbit the Earth.

11. A Planetary Surveillance System (PSS) for early detection of objects approaching Earth comprising:
a first space object detection system disposed proximate Earth, wherein said first space object detection system comprises a first constellation of Planetary Surveillance System Platforms (PSSPs) that detect objects in a solar system; and
at least one additional space object detection system that detects objects in the solar system and has a stationary galactic coordinate location in the solar system;
whereby early object detection is provided by the additional space object detection system, thereby enabling early tracking by the first space object detection system and the additional space object detection system.

12. The PSS of claim 11 wherein said at least one additional space object detection system comprises a second constellation of PSSPs disposed in an Aten asteroids region.

13. The PSS of claim 11 wherein said at least one additional space object detection system comprises a second constellation of PSSPs disposed near an asteroid belt between Mars and Jupiter.

14. The PSS of claim 11 wherein said at least one additional space object detection system comprises a second constellation of PSSPs disposed at an outer region of the solar.

15. The PSS of claim 11 wherein each PSSP comprises:
an electro optical camera system;
an image processing system to detect and track objects of interest;
a laser range finding system to determine range and range rate of the objects of interest;
a computational system to determine galactic location of the objects of interest and make estimates of orbital parameters;
a communication system to pass data to earth on the objects of interest being tracked;
health, location and attitude status of the PSSP and receive commands from earth's control station;
a laser and laser controller; and
a position adjustment system to bring the PSSP to a proscribed location and maintain roll, pitch and yaw.

16. The PSS of claim 15 wherein the objects comprise asteroids and said image processing system comprises:
a processing system for determining normalcy of optical field of view/field of regard through optical flow of celestial bodies, and predictable orbits of moons around planets;
a processing system for detecting asteroids entering the field of view/field of regard by subtracting a baseline image of the field of view from a currently obtained image with a resultant image containing the asteroid; and
a processing system for comparing a gray scale intensity of a star when it is partially occluded by one of the asteroids being in a same pixel at a time the image was taken.

17. The PSS of claim 11 further comprising:
a laser rangefinder for determining a range and range rate from the PSSP to the detected objects;
a record of a group of objects of interest;
a processing system for tracking said objects of interest; and
a processing system for angular rate changes of said objects of interest by comparing current pixel with previous pixel locations to be used in conjunction with range and range rate to compute orbital parameters.

18. The PSS of claim 11 further comprising a respective processing system for providing each PSSP with stability comprising:
a processor that uses tracking stars to determine galactic location and roll, pitch and yaw of said PSSP;

an internal navigation system to detect small changes in roll, pitch and yaw of said PSSP; and a control system linked to a movement system that makes adjustment to location and roll, pitch, and yaw.

19. The PSS of claim 11 wherein a revised galactic coordinate system is used to represent locations of space object detection systems, including at least one of planetary latitude, planetary longitude, and attitude through the use of a system centered on a sun, plane of planets with a vertical vector through a center of the sun for computing latitude and use of Ares star for computing longitude.

20. The PSS of claim 19 wherein the first space object detection system proximate Earth comprises satellites that orbit the sun and do not orbit the Earth.

* * * * *